United States Patent [19]

Bodai et al.

[11] 4,253,508

[45] Mar. 3, 1981

[54] SELECTIVE FILTERING OF TOBACCO SMOKE BY ENHANCED FILTRATION EFFICIENCY

[75] Inventors: Conrad A. Bodai, Davis; Balazs I. Bodai, Sacramento, both of Calif.

[73] Assignee: Bodai Industries, Inc., Dallas, Tex.

[21] Appl. No.: 4,818

[22] Filed: Jan. 19, 1979

[51] Int. Cl.³ .................. A24D 3/04; A24B 15/00; A24F 7/04
[52] U.S. Cl. .................................. 131/10.5; 131/202; 131/261 B
[58] Field of Search ............... 131/187, 261 R, 261 B, 131/201, 208, 209, 210, 212 R, 216, 217, 10.5, 10.3, 10 R

[56] References Cited

U.S. PATENT DOCUMENTS

| | | | |
|---|---|---|---|
| 2,360,628 | 10/1944 | Wright | 131/211 |
| 2,968,305 | 1/1961 | Barnett | 131/10 R |
| 3,292,635 | 12/1966 | Kolodny | 131/10.5 |
| 3,303,850 | 2/1967 | Parrigan | 131/182 |
| 3,525,345 | 8/1970 | Harris | 131/261 R |
| 3,590,827 | 7/1971 | Brudy et al. | 131/261 R |
| 3,958,579 | 5/1976 | Baker | 131/10.5 |
| 3,961,633 | 6/1976 | Schubert et al. | 131/94 |
| 3,978,869 | 9/1976 | Vehara et al. | 131/261 B |
| 4,135,523 | 1/1979 | Luke et al. | 131/261 B |

FOREIGN PATENT DOCUMENTS

| | | | |
|---|---|---|---|
| 440085 | 12/1967 | Switzerland | 131/9 R |
| 1103823 | 2/1968 | United Kingdom | 131/10 R |

*Primary Examiner*—Stephen C. Pellegrino

[57] ABSTRACT

The specification discloses structure where by applying modulated selectivity constituents are separated from tobacco smoke by stimulated coagulation and adsorption. An ultrasonic generating disc (30) is disposed in the flowstream of the tobacco smoke for generating an ultrasonic field having frequencies up to about 1 MHz to cause coagulation and adsorption of constituents in the flow. The disc (30) includes a ring of semicircular cavities (56), having sharp edges (54) defined on the boundary thereof, which form essentially a ring of vibrojet whistles facing into the flow. The vibrojet whistles are driven by the flow to produce high frequency vortices in the cavities (56). The cavities (56) resonate in phase to create disturbances downstream of the disc (30) which constructively interfere to create a high energy ultrasonic field in the flow. The cavities (56) are arranged so that the energy of the sonic field is directed into a relatively small region thereby inducing coagulation and adsorption.

14 Claims, 21 Drawing Figures

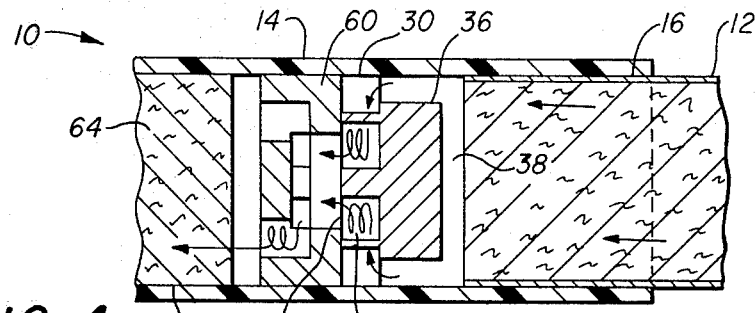
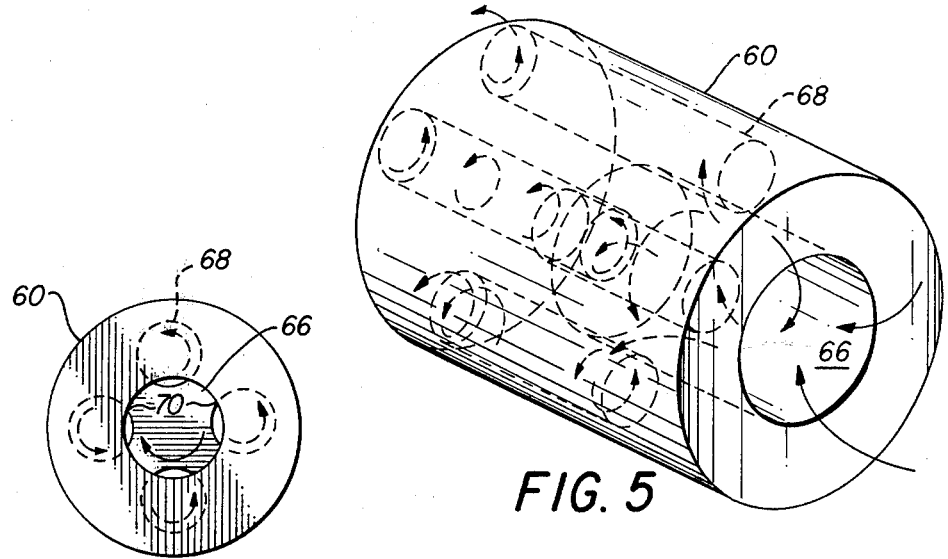
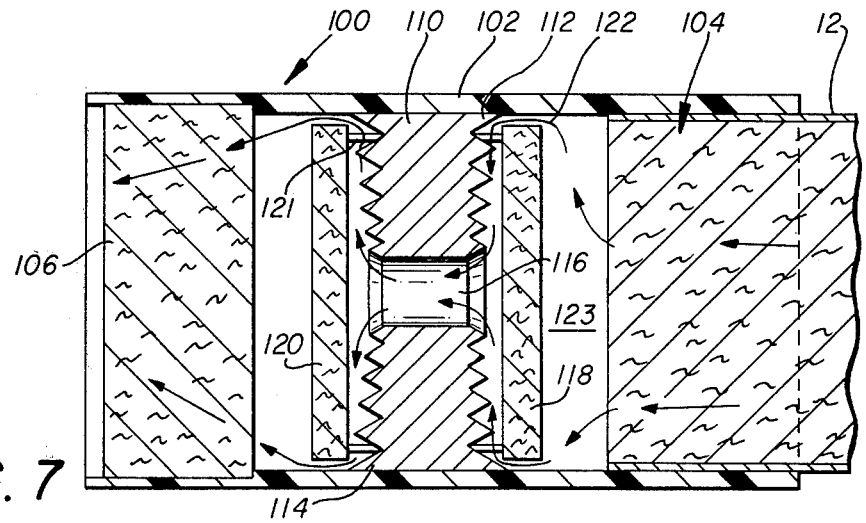

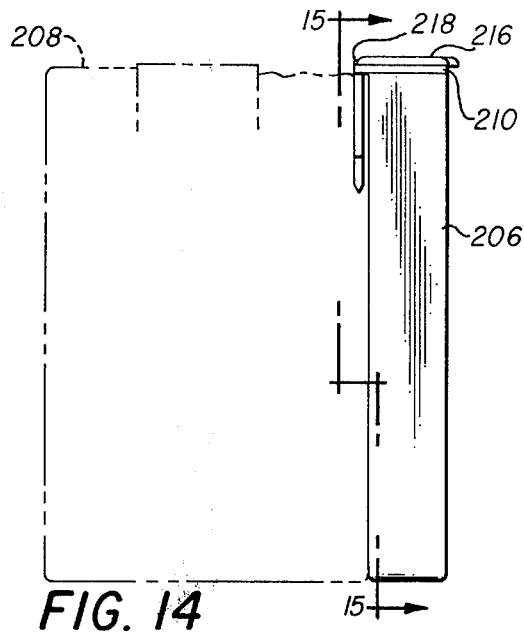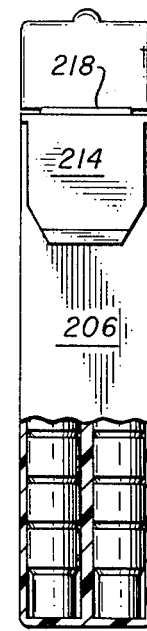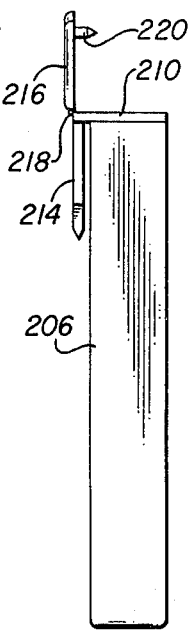
FIG. 14　　FIG. 15　　FIG. 16
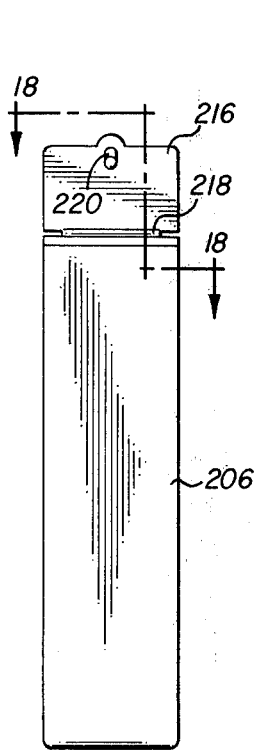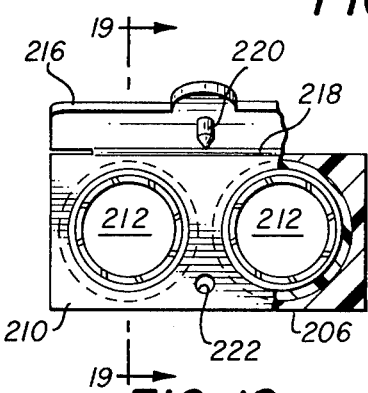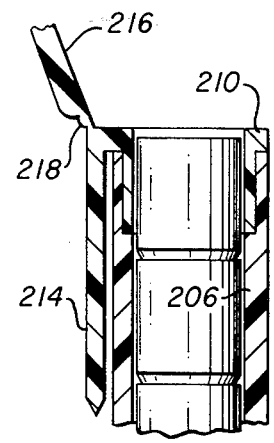
FIG. 17　　FIG. 18　　FIG. 19
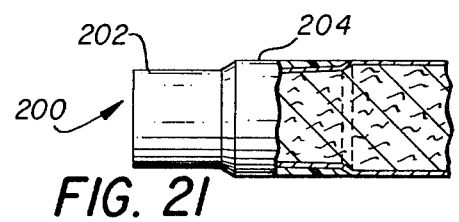
FIG. 21
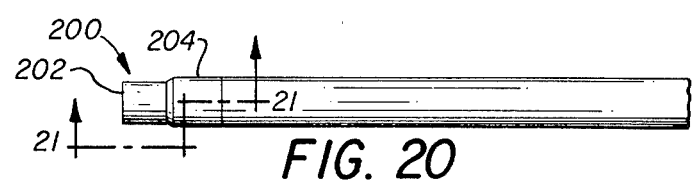
FIG. 20

SELECTIVE FILTERING OF TOBACCO SMOKE BY ENHANCED FILTRATION EFFICIENCY

TECHNICAL FIELD

This invention pertains to the filtering of aerosols, vapor phase constituents and gases from smoke streams and more particularly to apparatus for extracting particulate matter, vapor phase constituents and gases-carcinogenics from tobacco smoke by stimulated coagulation and adsorption and modulated selectivity.

BACKGROUND ART

The deleterious effects of cigarette smoking on the pulmonary, cardiovascular and neurological systems are well documented. Although the health hazards of cigarette smoking are widely recognized, efforts directed at motivating people to quit the habit have been unsuccessful. Despite widespread recognition and publication of the health hazards associated with smoking and the proliferation of antismoking campaigns, clinics and therapies, a substantial percentage of the adult and adolescent populations of the world continue to smoke. In fact, recent reports indicate that consumption of cigarettes is increasing.

The need for a less hazardous cigarette is therefore evident. Recent attempts have been made by manufacturers to develop cigarettes with reduced tar and nicotine content. Despite these efforts, cigarettes available on the market today are relatively ineffective in reducing the constituents with which the major risks of smoking are associated. While some cigarettes are effective in the reduction of the larger ash forming particles, such as the aliphathic hydrocarbons, such cigarettes are unacceptable because elimination of these constituents substantially affects the taste and has only a minimal effect on removal of the most dangerous components. Finer filters, capable of filtering out smaller, more dangerous constituents have been proposed, but are not feasible because the increased air resistance such filters would have and the increased cost of manufacture would far outweigh the marginal benefits obtained.

Accordingly, a need arises for a selective cigarette filter which eliminates the most hazardous particulate components of tobacco smoke without significantly increasing the flow resistance of the filter and without removing a disproportionate share of the constituents responsible for taste.

DISCLOSURE OF THE INVENTION

In accordance with the present invention, a sonic filter providing enhanced filtration is disclosed for separating and retaining particles, vapor phase constituents and gaseous components from tobacco smoke by stimulated coagulation and adsorption.

In accordance with the fist embodiment of the invention, a sonic generating disc is disposed in the flowstream of tobacco smoke capable of generating an ultrasonic field having frequencies up to about 1 MHz. The disc includes a ring of vibrojet whistles facing into the flow, driven by the flow to produce high frequency vortices therein. Each of the vibrojet whistles includes a resonating cavity dimensioned to resonate in phase with the others to create a disturbance which constructively interferes with the disturbances produced by the other cavities to provide a high energy field in the flow. The cavities are arranged such that the energy of the field is concentrated into a small region of the flow where conditions for stimulated coagulation and adsorption are highly favorable.

In accordance with the second embodiment of the invention, a sonic generating disc is disposed in the flowstream of tobacco smoke for generating a sonic field having frequencies to about 1 MHz. The disc includes a ring of vibrojet whistles facing into the flow, driven by the flow to produce high frequency vortices therein. Each of the vibrojet whistles includes a resonating cavity dimensioned to resonate in phase with the others to create a disturbance which constructively interferes with the disturbances produced by other cavities to provide a high energy field in the flow. The cavities are arranged so that the energy of the field is concentrated into a small region of the flow where conditions for stimulated coagulation and adsorption are highly favorable. A frequency and amplitude multiplier, disposed downstream of the disc, contains a central compression cavity opening upstream, surrounded by a ring of axially disposed multiplier cavities of smaller diameter. The multiplier cavities peripherally intersect the compressor cavity to permit passage of the agitated flow into the multiplier cavities where yet additional frequency multiplication takes place. The sharp edges defined by the intersection of the multiplier and compressor cavities resonate in phase to cause disturbances which constructively interfere to create a second higher energy field in the flow. The multiplier cavities are arranged so that the energy is concentrated into a small region in the flow where yet additional coagulation and adsorption takes place.

In accordance with a third embodiment of the invention, a sonic generating disc driven by the flow is positioned axially in the flowstream. The disc has identically contoured anterior and posterior surfaces, communication between which is provided by a central aperture in the disc. Two nonporous discs having diameters slightly less than the generating disc are positioned upstream and downstream of the anterior and posterior surfaces. The upstream disc diverts tobacco smoke to the periphery thereof across the anterior surface of the generating disc to the central aperture and the downstream disc diverts the flow from the central aperture across the posterior surface of the generating disc to the periphery of the downstream disc. The anterior and posterior surfaces are contoured such that vortices are created in the flow, subjecting particles in the flow to higher and higher frequencies up to about 1 MHz as they cross the anterior surface. The generating disc is also contoured to provide collision surfaces whereby all particles vibrate in phase with increasing vibrational energy being imparted to the particles as they cross each of the anterior and posterior surfaces, thereby inducing coagulation and adsorption.

In accordance with a fourth embodiment of the invention, a sonic generating disc driven by the flow is provided axially in the flowstream. The disc has identically contoured anterior and posterior surfaces. Two nonporous discs having diameters slightly larger than the generating disc and each having an aperture defined centrally therein are positioned upstream and downstream of the anterior and posterior surfaces. The upstream disc diverts tobacco smoke to the center of the anterior surface where it is diverted around the periphery of the generating disc and the downstream disc diverts the flow from the periphery of the generating disc across the posterior surface to the center through the aperture of the downstream nonporous disc. The anterior and posterior surfaces are contoured such that vortices are created in the flow across the surfaces subjecting the particles to higher and higher frequencies as the particles cross the posterior surface. The generating disc is also contoured to provide collision surfaces whereby all particles vibrate in phase as they cross each of the anterior and posterior surfaces thereby inducing coagulation and adsorption.

BRIEF DESCRIPTION OF THE DRAWINGS

FIG. 4 is a section view of the external cigarette mouthpiece of FIG. 1 showing a second embodiment of the invention which functions as a frequency and amplitude multiplier;

FIG. 5 is an isometric view of a vortex frequency and amplitude multiplier shown in FIG. 4;

FIG. 6 is a front end view of a vortex frequency and amplitude multiplier of FIG. 5;

FIG. 7 is a section view of a different type of the external cigarette mouthpiece illustrating a third embodiment of the invention;

FIG. 14 is a broken outline view of a cigarette package showing a filter packet containing a plurality of filters as it would appear when mounted at one side of the cigarette package;

FIG. 15 is a partial sectional view of the cigarette packet taken from 15—15 of FIG. 14, and showing the packet lid in its raised position;

FIG. 16 is an edge view thereof;

FIG. 17 is a side view thereof viewed from the opposite direction through FIG. 15;

FIG. 18 is an enlarged partial plan sectional view thereof taken from 18—18 of FIG. 17;

FIG. 19 is an enlarged fragmentary sectional view taken through 19—19 of FIG. 18;

FIG. 20 is a side view of a cigarette showing one of the tobacco smoke filters adapted for reception in the filter packet mounted on one end thereof; and FIG. 21 is an enlarged fragmentary view partially in section and partially in elevation taken through 21—21 of FIG. 20.

DETAILED DESCRIPTION

Figure 1:
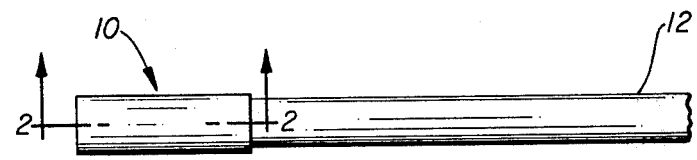
FIG. 1 is a perspective view of an external cigarette mouthpiece retaining a conventional cigarette.

Tobacco smoke is a two phase system consisting of a vapor phase and an aerosol phase. The vapor phase contains those constituents that are volatile at about 30° C., including some of the major carcinogenic constituents of tobacco smoke. As used herein, the term "constituents" will refer collectively to the particulate matter, vapor phase constituents, and gases associated with vapor phase constituents in tobacco smoke. Most of the particulate and vapor phase constituents of tobacco smoke range in size from about $10^{-2}$ to about 1 micron, well below the pore size of conventional filters. Because a suitable filter for filtering constituents of this size is not available, most cigarettes use impingement filters in which a large number of surfaces are placed in the path of the smoke to eliminate some of the larger constituents by collisions with the impingement surfaces. Such filters eliminate the largest but not necessarily the most dangerous constituents of tobacco smoke.

It is known that at frequencies in the range of about 50 kHz to 1 MHz, particles less than 1 micron in diameter can be separated from an aerosol, or vapor phase, by stimulated coagulation and adsorption, provided the particles possess sufficient vibrational energy for collision. For more details concerning the particular frequencies required, see:

Hueter and Bolt, *Sonics,* pages 213–15 (1955) John Wiley & Sons (hereafter Hueter and Bolt).

In the present invention the necessary ultrasonic frequencies for stimulated coagulation and adsorption are generated and the necessary vibrational energy imparted to the tobacco smoke particulates to separate the particles by agglomerizing these tiny particles into larger ones whose size is sufficient to resist flow through a conventional filter or to adhere to the surfaces of the internal structure of the invention.

Stimulated coagulation and adsorption are the resultant effects of an ultrasonic sound wave on a suspension of particles such as tobacco smoke. Simple harmonic motions, propagating in an aerosol medium, will impart vibratory motion to the particles, the smaller particles following the vibrations to a greater extent than the larger ones. Collision is the recognized mechanism of the coagulation process. For coagulation to occur, however, the particles must have sufficient threshold vibrational energy; once this is provided, the greater the frequency of vibration, the more frequent the collisions become and thus the more thorough the coagulation process. As particles continue colliding with additional particulate matter, they increase in size and mass until only a small number of relatively large particles remain in the system. Stated differently, the energy applied by the smoker in suction is applied to rapidly shift the mass phase distribution of the tobacco smoke from a large number of small particles to a small number of larger particles of greater mass. Eventually the size of the coagulated particles is sufficiently large to exceed the porosity of a conventional filter medium and a significant percentage of the constituents are then trapped. For a detailed discussion of the mechanism of coagulation in a sonic field, reference may be made to:

Evgenii Pavlovich Mednikov, *Acoustic Coagulation and Precipitation of Aerosols,* as translated from the Russian by Larrick, Consultants Bureau, (1965) (hereafter Mednikov).

The higher the available frequency, the smaller the particle that can be coagulated and adsorbed. The size of the agglomerated particle is linearly related to the frequency of the sonic field. Thus, particles of a given size and mass will be most effectively coagulated at some optimum frequency. Further discussion of the methods used to calculate the optimum frequency for a particular particle of known size may be found by referring to Hueter and Bolt, pages 213-15.

When coagulation of particles of different sizes is desirable, generation of a spectrum of frequencies is required. The present invention is designed to generate a spectrum of frequencies which contains the optimum processing frequency of the various particles in tobacco smoke. On the other hand, it may be desirable to operate the invention at selective frequencies for filtering out some particular constituent or constituents, such as, for example, the major carcinogenic constituent of tobacco smoke, benzopyrene (BaP). In such a case, the structure disclosed below can be designed to resonate at predetermined frequencies.

In the present invention, the sonic field is produced by a sonic generator which acts as both a frequency multiplier for generating the necessary spectrum of ultrasonic frequencies and an amplitude amplifier for imparting sufficient vibrational energy to the particles in the tobacco smoke necessary for coagulation. Generally speaking, frequency multiplication is accomplished by one of several vortex generating techniques whereby the frequency of vibration of the particles is arbitrarily multiplied without increasing the impedance of the filter. Amplitude amplification takes place by constructively interfering a number of in phase resonating sources of uniform strength to produce a resulting force field whose intensity is several times that of the individual sources. By appropriately choosing the geometry of the sonic generators, the sonic energy is focused into a relatively small region in the flow to make the most efficient use of the available energy.

Figure 2:
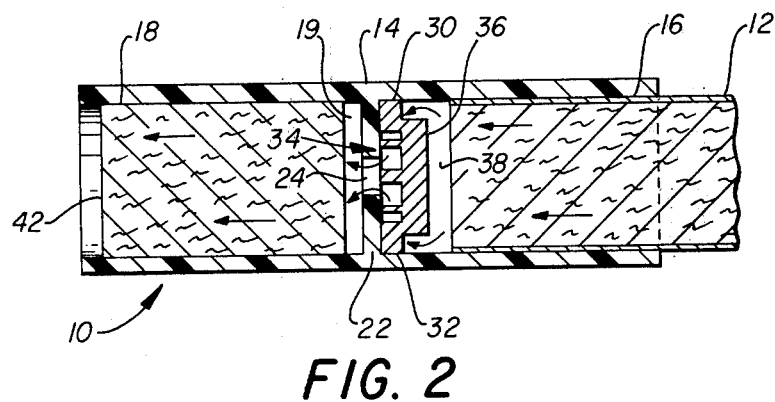
FIG. 2 is a section view of the external cigarette mouthpiece taken along the line 2—2 of FIG. 1 illustrating a first embodiment of the invention.
Figure 3:
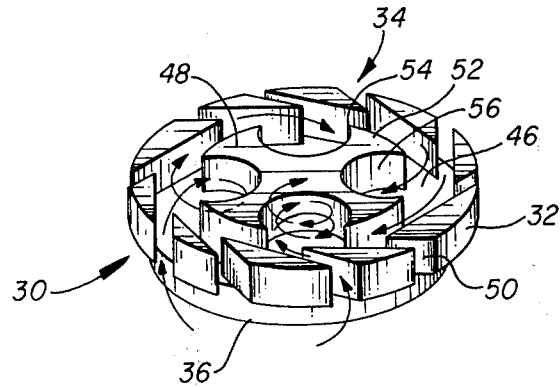
FIG. 3 is a perspective view of the sonic generating disc shown in FIG. 2 showing the ring of vibrojet whistles.

Reference is made to FIGS. 1-3 which illustrate a first embodiment of the invention. It will be understood that each of the embodiments of the invention may be used in either an external cigarette mouthpiece adapted for use with a conventional cigarette or manufactured internally as an integral part of a cigarette. By way of example, FIG. 1 shows a first embodiment mounted in a cigarette mouthpiece 10, adapted for receiving a conventional cigarette 12. As shown in FIG. 2, cigarette mouthpiece 10 comprises a tubular shell 14, preferably formed of plastic, divided into two hollow coaxial portions, a cigarette receiving portion 16 and a filter portion 18. The cigarette receiving portion 16 is interiorly dimensioned to snuggly retain the proximal end of a conventional cigarette. Filter portion 18 is designed to retain conventional fiber filter and is designed to be taken into the mouth of the smoker. Alternatively, cigarette mouthpiece 10 could be constructed with filter portion 18 having a smaller diameter than receiving portion 16 to suit the preference of the smoker who may prefer a design shaped similar to conventional cigarette mouthpieces as shown in FIGS. 20 and 21.

A partition 22 divides filter portion 18 and receiving portion 16. Access to filter portion 18 from portion 16 is provided by a small cylindrical aperture 24 through which highly agitated tobacco smoke is discharged as described below in greater detail.

The cigarette 12 is press fitted into portion 16 such that the proximal end is spaced some distance from a disc 30, which forms essentially a set of vibroject whistles, mounted in portion 16 upstream of partition 22.

Disc 30 is manufactured of plastic and has a cylindrical peripheral edge 32 with a downstream facing posterior surface 34 and an upstream facing anterior face covered by a cap 36 of slightly less diameter than the disc. Cap 36 is separated from the proximal end of the cigarette by a space 38 where tobacco smoke from cigarette 12 will collect. Because of the barrier provided by cap 36, the smoke will be diverted to the periphery of the disc where it will pass to the posterior surface as shown by the arrows in FIG. 2.

As will be described hereafter in greater detail, a highly energetic ultrasonic field is produced in cylindrical aperture 24 and posterior resonating chamber 19 between partition 22 and conventional filter material 42 in which the constituents of the tobacco smoke are highly concentrated and subjected to a high energy sonic field where they undergo coagulation and adsorption. The coagulated particles then impact against and are retained by a suitable filter material 42 such as a cotton plug or acetate fiber which is positioned in filter portion 18.

Referring now to FIG. 3, the sonic generating disc 30 of FIG. 2, which essentially forms a ring of vibrojet whistles, is shown in greater detail. Disc 30 has a contoured posterior surface 34, which has a network of channels 46 communicating with the periphery of the disc and a cruciform structure 48 positioned centrally thereof.

As best seen in FIG. 3, peripheral edge 32 radially overhangs cap 36 such that a series of passageways 50 cut axially into the periphery of the disc at equally spaced intervals around edge 32 to permit passage of tobacco smoke from upstream of the cap 36 to the posterior surface 34. Passageways 50 communicate with channels 46 on the posterior surface 34. The essentially laminar flow of tobacco smoke in cigarette receiving portion 16 is transformed into turbulent flow in passageways 50. Passageways 50 are not cut toward the center of the disc, but at an angle thereto for the purpose of producing rotational turbulent flow of tobacco smoke across posterior surface 34. In FIG. 3, for example, passageways 50 are cut such that tobacco smoke flowing to the posterior side thereof will undergo a clockwise rotation.

The cruciform structure 48 provided in the center of posterior surface 34 consists of four mutually perpendicular arms 52, the ends of which define two anchor-shaped sharp edges 54. The area between adjacent arms is cut so as to define a semicircular cavity 56, whose diameter is much smaller than the disc.

The flow of tobacco smoke through passageways 50 impacting orthogonally against partition 22 is converted to clockwise turbulent flow at the posterior surface 34. When the rotating turbulent flow encounters the sharp edges 54 of cavities 56, the flow behaves essentially as in a vibrojet whistle. Vortices are created in each of cavities 56 due to the flow onto the sharp edges 54 in the wall of cavities 56 as in a "police whistle." The angular frequency of the vortices created in cavities 56 depends in a rather complicated way on the volume fluid flow rate or pressure gradient induced by the smoker, but generally it can be said that the greater force exerted by the smoker, the higher the frequencies that will be produced. For a more detailed discussion of the behavior of the vibrojet whistle, of which the structure described above is a modified form, reference should be made to Mednikov, page 20.

Disc 30 is also designed to impart the necessary vibrational energy to the particulate constituents in the smoke as required for coagulation and adsorption. The flow of tobacco smoke against the sharp edges 54 of each cavity 56 causes each of the four cavities to resonate like police whistles. Since the cavities 56 resonate in phase and with uniform intensity, the disturbances produced by each constructively interfere and the intensity of the resulting force field will be sixteen times the amplitude of the disturbance produced by a single resonating cavity. Of course, any number of cavities may be used, in which case the intensity of the force field will be determined by the laws of constructive interference and the principle of superposition. The geometrical arrangement of the cavities 56 in a ring configuration makes it possible to directionally focus the energy into a relatively small region, such as within the cylindrical aperture 24 in partition 22. By a proper choice of dimensions and number of cavities, the cavities can be made to resonate at one of the frequencies of the vortex to optimize coagulation of particles of a given size. It is thus possible to selectively filter out selected particles from the smoke, if desired.

It is characteristic of all wave phenomena that the energy radiated by a circular ring of resonating sources of uniform intensity will be concentrated into relatively small regions in space. The particular directivity pattern will be determined by the relative dimensions of the ring and cavities as well as the frequency of vibration. For further details concerning the directivity pattern of a ring of uniform vibrating sources, reference should be made to:

Olson, *Acoustical Engineering*, (1957) Van Nostrand Co., Inc. (hereafter Olson).

As outlined above, the directional characteristics of disc 30 concentrate the energy within a relatively small region in the flow, the particular directivity pattern depending upon a number of factors. Because the smoke constituents travel through the sonic field relatively rapidly and the energy of the sonic field dissipates inversely with the fourth power of the distance, concentration of the force field into a relatively small area in the path of the flow is vital to achieve sufficient coagulation.

As the smoker draws intermittently through the filter, high velocity flow of tobacco smoke is periodically produced in the space 38. During drawing, the smoke constituents will flow toward the periphery of disc 30 into passageways 50. As the smoke is drawn through passageways 50, the essentially laminar flow in portion 16 is converted to rotational turbulent flow in channels 46. The rotating turbulent flow is then deflected and divided by the sharp edges 54, which face into the moving mass, and vortices are set up within the cavities 56 converting the turbulent flow to vortex flow. The smoke constituents are then discharged into cylindrical aperture 24 with high angular momentum into a highly energetic sonic field in which coagulation and adsorption takes place.

As smaller constituents become increasingly larger during the coagulation process, the larger constituents which have not yet been discharged through cylindrical aperture 24 will rotate in the outer orbits and collide with the walls of cylindrical aperture 24 and filter portion 18, which will increase their vibrational energy causing some of them to adhere to the walls of the partition and cavities. By catalytically treating the surfaces of the cavities and aperture by any of a variety of catalysts well known in the art, such as, for example, thin film platinum, adherence of some of the constituents and gases to the walls of the filter may be greatly enhanced. The remaining coagulated particles and vapor phase constituents, with which some of the gaseous components will be associated, will be discharged and will collect on filter material 42. As a result of the stimulated coagulation and adsorption, a large percentage of the smoke constituents will be coagulated into sizes which exceed the porosity of the conventional filter 42 and will therefore not pass into the lungs of the smoker.

FIG. 4 shows a second embodiment of the invention, which essentially is a modification of the first embodiment with a second stage frequency and amplitude multiplier added. In the external construction in which the second embodiment is used in an external cigarette mouthpiece, a frequency and amplitude multiplier 60 is placed downstream of disc 30, replacing partition 22 in the first embodiment shown in FIG. 2. As with all other embodiments of the invention described herein, it will be understood that the second embodiment need not be limited to external use in a cigarette mouthpiece, but may be incorporated as an integral part of a modified cigarette as well.

As shown in FIG. 4, a conventional filter medium 64, such as cotton plug or acetate fiber, is provided downstream of frequency and amplitude multiplier 60 upon which the coagulated constituents are retained and through which the filtered smoke is allowed to pass.

FIG. 5 shows the frequency and amplitude multiplier 60 in greater detail, which is adapted to be coupled to the disc 30 (not shown). Multiplier 60 contains a central compression cavity 66, closed at its posterior end and opening at its anterior end toward cavities 56 of the disc (FIG. 4). A set of four smaller cylindrically shaped multiplier cavities 68 open at the posterior end of frequency and amplitude multiplier 60 and communicate with compression cavity 66 by radially overlapping the periphery of the cavity 66 a sufficient distance to permit some of the constituents in the compression cavity to discharge into the smaller multiplier cavities 68. Although four cavities are illustrated in this particular embodiment, it will be understood that any number of cavities may be used, depending upon the application. The axially overlapping walls of cavities 66 and 68 define sharp edges 70 at the point where the walls intersect as best seen in FIG. 6.

In the second embodiment, processing of the tobacco smoke through the first stage of the filter, i.e., through discharge into compression cavity 66, takes place as previously described. The vortices produced by cavities 56 are integrated in a resultant vortical motion in compressor cavity 66. The smaller sized lighter constituents tend to remain in the vortex and are subjected to higher vortex frequencies by virtue of the increased angular momentum in the smaller compression cavity 66. Since the end of compression cavity 66 is closed, the smaller constituents are confined to the low pressure orbitals until their size and mass are increased by coagulation to allow migration into orbitals of increased radius.

The phase shift and size and mass concentration is rapidly increased in this particle size group. Part of the larger constituents move into the multiplier cavities 68 while the remaining fraction is enriched by newly entering constituents. When the high frequency rotating tobacco smoke in compression cavity 66 encounters the sharp edges 70 of multiplier cavities 68, the flow behaves essentially as in a vortex whistle. The cavities resonate like organ pipes, in phase and with uniform intensity, each producing a resulting disturbance which constructively interferes with the others to produce a high energy field smilar but much greater in magnitude than that produced in the first stage. It will be evident that the directional characteristics of the field downstream of frequency and amplitude multiplier 60 will likewise be highly concentrated since the multiplier cavities 68 are arranged to form a ring of vibrating energy sources. Thus, the larger agglomerated constituents which actually escape to the second stage of the filter are subjected to an even more energetic force field at yet higher frequencies, which further enhance the coagulation and adsorption process. By the time these constituents are discharged from multiplier cavities 68, most of them will be sufficiently large to be trapped by the filter medium 64. Again, the separation process may be further enhanced by catalytically coating the walls of frequency and amplitude multiplier 60.

Compression cavity 66 and multiplier cavities 68 form what is essentially a vortex whistle. The angular frequency of the secondary vortices created in cavities 68 depends linearly on the volume fluid flow rate or pressure gradient induced by the smoker. As the volume flow rate or pressure gradient varies continuously in a single draw, a continuous spectrum of frequencies corresponding linearly to the changing flow rate will be generated. This spectrum of frequencies will include the optimum coagulation frequency of each of the various constituents of the tobacco smoke. For a more detailed discussion of the behavior of the vortex whistle, of which the structure described above is a modified form, reference may be made to:

Vonnegut, "A Vortex Whistle", 26 Journal of the American Acoustical Society 18, (1954); and B. Carlin, *Ultrasonics*, pages 129–30 (1960), McGraw-Hill.

Referring now to FIG. 7, a third embodiment of the invention is illustrated in which an external cigarette mouthpiece 100 is shown, being a substantially cylindrical shell 102 defining a conventional cigarette receiving portion 104 and a filter portion 106 in open communication therewith. A sonic generating disc 110 formed of surfaces defining a network of counterspirally intersecting corridors is mounted axially in mouthpiece 100 between filter portion 106 and the proximal end of the cigarette 12. Disc 110 has identical anterior and posterior contoured generating surfaces 112 and 114 with a circular aperture 116 defined centrally therein providing communication between the surfaces. Surfaces 112 and 114 are substantially covered by two nonporous paper discs 118 and 120, supported therefrom by splines 121, adapted to divert the flow of smoke to the periphery thereof.

As best seen in FIG. 7, generating disc 110 and nonporous disc 118 are spaced apart from the proximal end of cigarette 12 to facilitate collection of smoke in space 123 defined between disc 118 and the cigarette. The diameter of nonporous disc 118 is somewhat less than the diameter of disc 110 which extends entirely to the interior surface of shell 102 so that an annular inlet 122 is provided around the periphery of disc 118 to permit tobacco smoke to flow to the edge of anterior surface 112.

Figure 8:
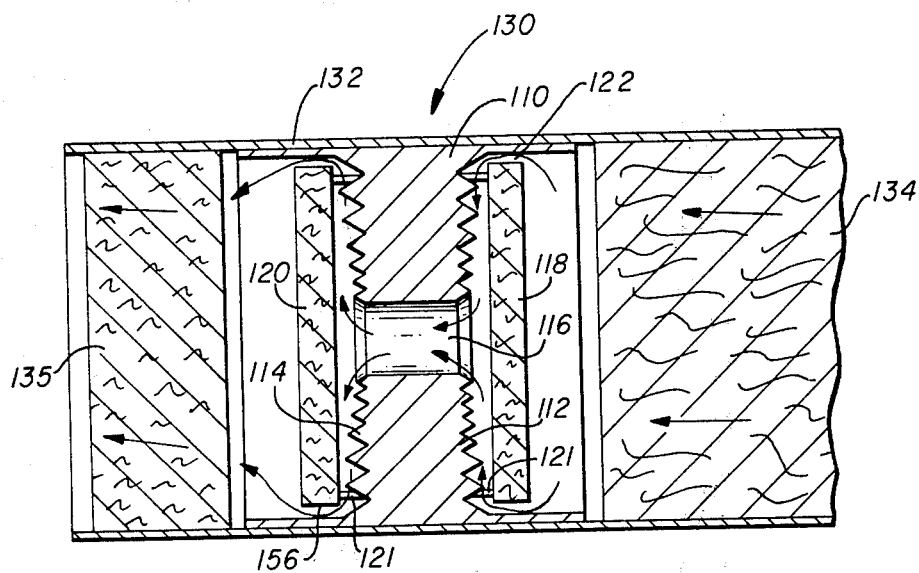
FIG. 8 is a section view of the third embodiment of the invention in which the filter is an integral part of a modified cigarette.

As earlier stated, the embodiments of the invention are not limited to use in a cigarette mouthpiece, but may be manufactured as an integral part of the cigarette as well. FIG. 8 illustrates the third embodiment of the invention, this time as an integral part of a modified cigarette 130. The proximal end of modified cigarette 130 is shown having a cylindrical paper shell 132 containing tobacco 134, separated from an acetate fiber 135 by a generating disc 110 and nonporous paper discs 118 and 120 as in FIG. 7. Structural support for disc 118 and its counterpart disc 120 may be provided by splines 121 which pass axially through generating disc 110. The flow of tobacco smoke around nonporous disc 118 across surface 112, through aperture 116, across surface 114 and around nonporous disc 120, as shown by the arrows, is identical to the flow pattern shown in FIG. 7 as described below in greater detail.

Referring now to both FIGS. 7 and 8, the placement of the nonporous disc 118 to substantially cover the anterior generating surface 112 of disc 110 results in an increase in the flow gradient at the annular inlet 122 at the periphery of the cigarette. The pressure build-up at the periphery of disc 118 alters the normal flow pattern of tobacco smoke through the cigarette such that improved combustion reaction at the distal end tends to occur closer to the periphery of the cigarette resulting in cleaner burning due to the presence of more oxygen. The improved stoichiometry of the combustion reaction retards the rate of formation of several noxious gaseous constituents of tobacco smoke, such as carbon monoxide, nitrous oxides and most importantly, hydrogen cyanide. Thus, in addition to sonic filtering of harmful constituents, this embodiment also causes favorable reduction of harmful gaseous constituents by improved combustion.

Figure 10:
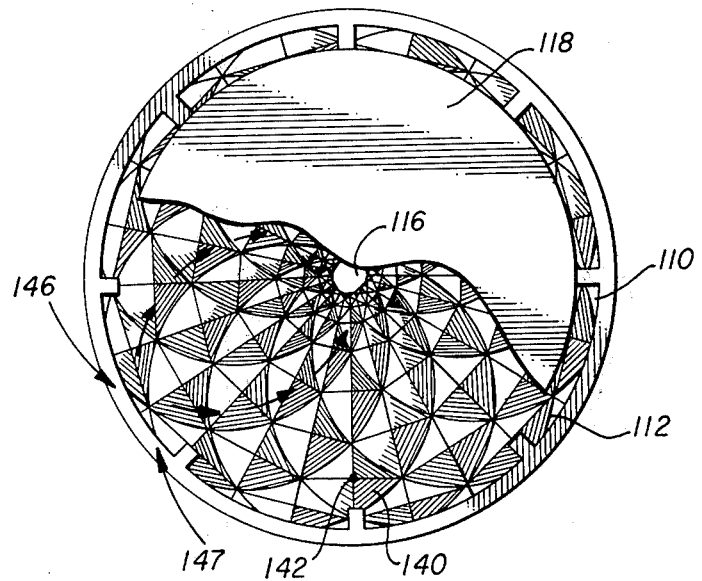
FIG. 10 is a plan view of the sonic generating disc of FIG. 9 showing a segment of the nonporous disc of FIGS. 7 and 8 broken away.
Figure 9:
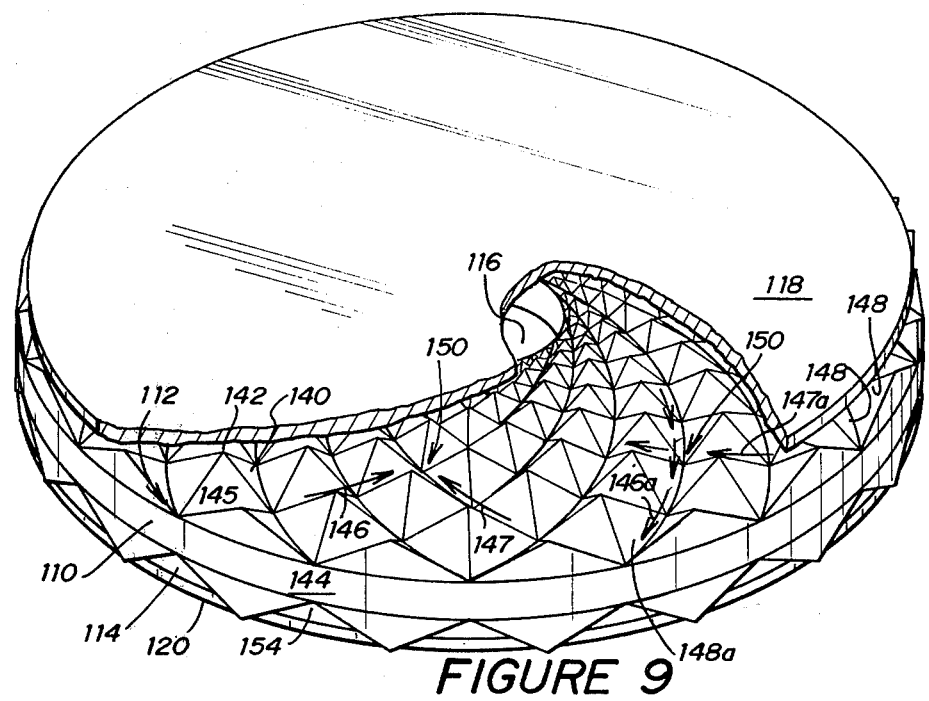
FIG. 9 is a partial perspective view of the sonic generating disc shown in FIGS. 7 and 8 showing a segment of the nonporous disc of FIGS. 7 and 8 broken away.

Reference is now made to FIGS. 9 and 10 in which the sonic generator disc 110 is shown in greater detail. Anterior and posterior surfaces 112 and 114 of the disc are identical and comprise an array of pyramidals 140 (pyramids having curvilinear faces) whose peaks 142 (FIG. 10) continuously decrease in height toward the central aperture 116, all peaks 142 at the same distance from the central aperture 116 being the same height. The walls 145 of adjacent pyramidals define a network of counterspirally intersecting corridors 146 and 147 (of opposite curvature) formed at equally spaced points around the periphery 144 of the disc and extending to the central aperture 116 as seen in FIGS. 9 and 10. Tobacco smoke is channeled from the periphery down corridors 146 and 147, where coagulation takes place at every intersection of corridors, through central aperture 116 and out to periphery 144 again through identical corridors 146 and 147 formed on the posterior surface 114.

As shown in FIG. 9, the nonporous disc 118 which substantially encloses surface 112 is tangent to peaks 142 at disc 118's peripheral edge, thereby defining a series of ports 148 around the periphery of the generating disc into which tobacco smoke flowing from annular inlet 122 (FIG. 8) passes.

Referring now to FIGS. 9 and 10, it will be seen that each of the corridors 146 and 147 contains a series of valleys 150 formed by the pyramidal walls 145 of the corridor and by the pyramidal walls of the intersecting corridors of opposite curvature.

The necessary conditions for stimulated coagulation and adsorption, namely, ultrasonic frequencies up to about 1 MHz sufficient threshold vibrational energy, are provided by the interaction between the constituents in the tobacco smoke and the walls of the corridors of generating disc 110. As best seen in FIG. 9, a stream of tobacco smoke passing down a corridor 146a into a valley 150a from a peripheral port 148a will intersect a stream of smoke passing into the same valley from a port 148b via a corridor 147a of opposite curvature. Constituents in corridor 147a will have a velocity which is essentially orthokinetically directed to the velocity of the constituents in corridor 146a, as shown by the arrows in FIG. 10. The constituents in these intersecting smoke streams will be subjected to a cyclone effect as a miniature vortex is created in each valley 150 on the surface. As the constituents continue to flow down the corridors into successive valleys on the anterior surface, they will be subjected to increasingly higher angular frequencies as the area of confinement between walls 145 rapidly decreases toward the center. If the flow rate of the smoke is sufficiently high, a spectrum of frequencies sufficient to coagulate most of the constituents will be generated as the smoke flows from peripheral ports 148 to the central aperture 116. Moreover, the vibrations of the intersecting constituents caused by the impact with the pyramidal walls of surface 112 will be in phase since each of the constituents will have traveled precisely the same distance from the periphery and will have impacted with the pyramidals on the surface at precisely the same time. The conditions for constructive interference are thus met and vibrational amplitudes of the constituents will be increased within each valley, i.e., at the intersection of any two corridors. The surface, which contains a very large number of valleys, behaves essentially as a vibrating piston, concentrating the energy into a relatively small region of the flow. For further details concerning the directivity pattern produced by a nonuniform vibrating plane piston source, refer to Olson, pages 44–45. As the smoke crosses the surface, the constituents will be subjected to higher and higher frequencies and have increasingly higher vibrational energies. As the necessary frequency and vibrational energy is acquired, the constituents will begin to coagulate and will eventually become sufficiently massive to resist further flow down the corridors, becoming trapped in the valleys on either the anterior or posterior surface.

As streams of tobacco smoke cross anterior surface 112, they will collect in central aperture 116 and undergo the reverse process, flowing through corridors 146 and 147 from the central aperture to the periphery of the posterior surface 114. On the posterior surface, of course, the valleys will have increasingly greater surface area toward the periphery of the disc, with the result that the angular frequency of the constituents will decrease as the periphery is approached. This decrease in frequency, however, will be offset to some extent by the progressive reduction in density of the smoke as coagulated constituents are filtered out. The vibrational amplitude of the constituents, however, will continue to increase as they traverse the posterior surface of the disc unless the damping factor is sufficiently large to significantly reduce the amplitude of vibration. At the periphery of the posterior surface, the constituents will pass through ports 154 into the annular outlet 156 (FIG. 8) where the smoke is discharged. Depending upon the application, a multistage filtering process may be used in which the smoke is subjected to a series of sonic generating discs 110 or a combination of discs of different construction, such as for example, disc 110 and disc 160 shown in FIGS. 11–13 below. Alternatively, disc 110 may be used with a frequency and amplitude multiplier positioned against the posterior side in which case only the anterior surface 112 of the disc need be formed. Constituents passing through aperture 116 will then enter compression cavity 66 of multiplier 60 and be subject to the frequency and amplitude multiplication effect described above, further enhancing coagulation and adsorption.

Figure 12:
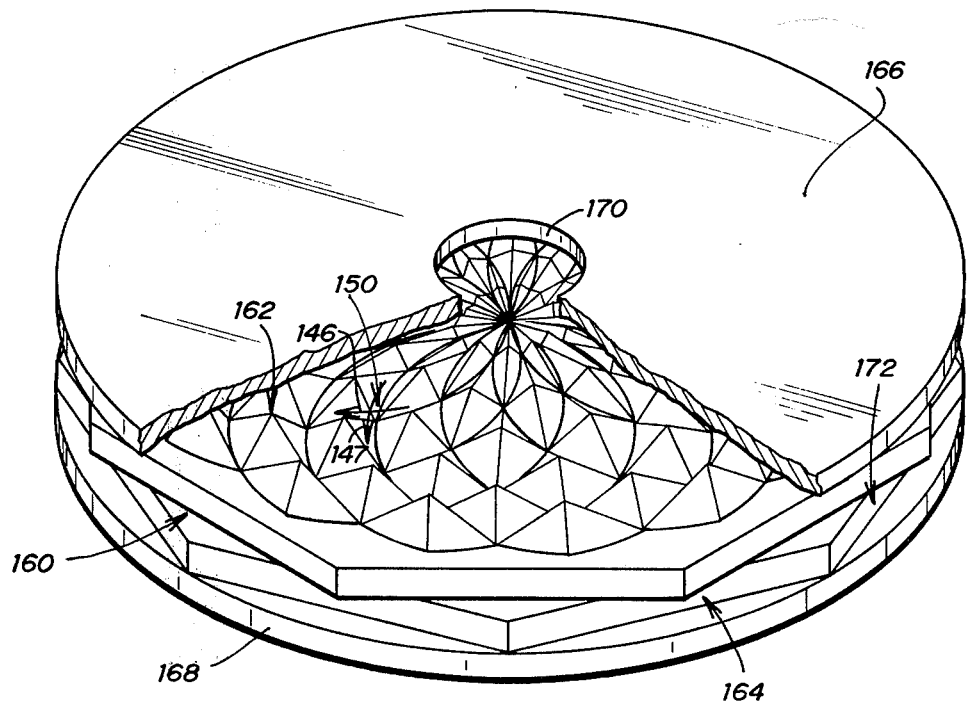
FIG. 12 is a perspective view of the sonic generating disc shown in FIG. 11.
Figure 11:
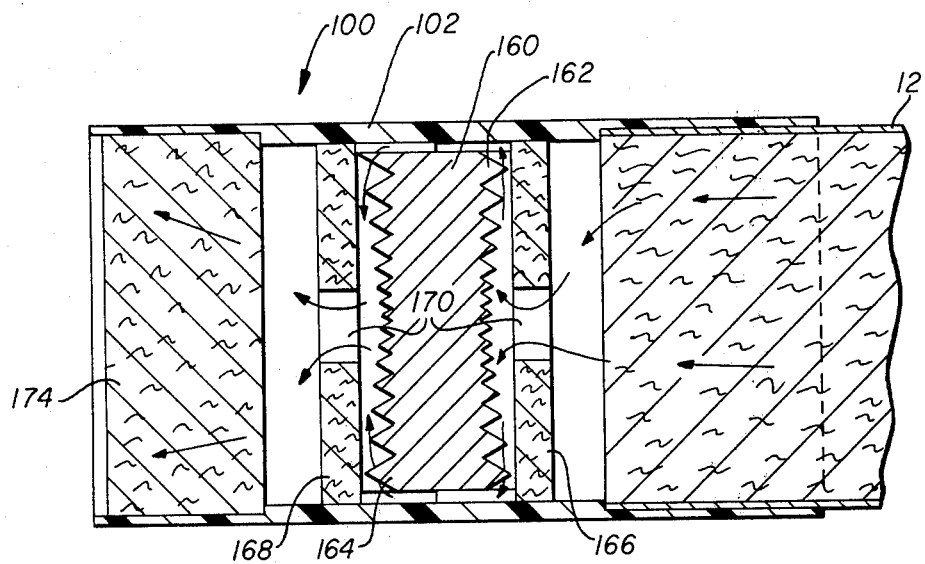
FIG. 11 is a section view of an external cigarette mouthpiece illustrating a fourth embodiment of the invention.
Figure 13:
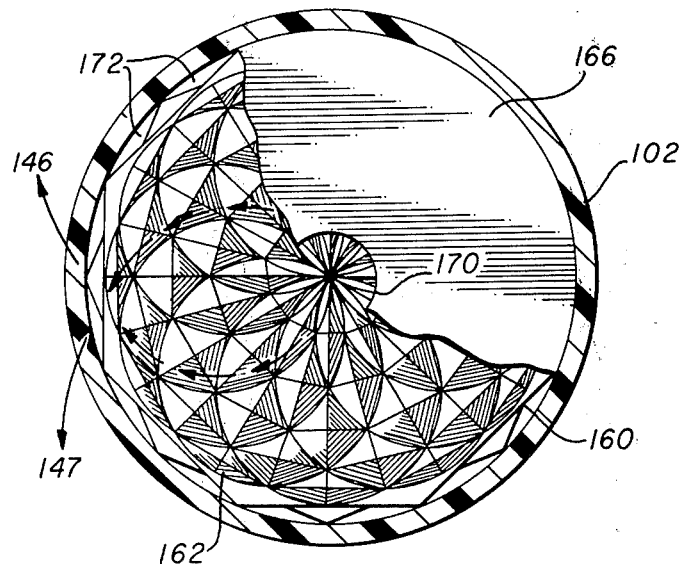
FIG. 13 is a plan view of the sonic generating disc shown in FIG. 12 showing a segment of the nonporous disc of FIG. 11 broken away.

Reference is now made to FIGS. 11–13 in which a fourth embodiment of the invention is shown, wherein the like numbers are used to indicate elements identical to earlier embodiments.

In the fourth embodiment, the sonic generator is polygonally shaped disc 160, the anterior and posterior surfaces 162 and 164 of which likewise define a network of counterspirally intersecting corridors as in surfaces 112 and 114 of disc 110 (third embodiment). Disc 160 differs from disc 110 in that it does not have a central aperture.

As best seen in FIG. 11, nonporous annular discs 166 and 168 enclose surfaces 162 and 164, respectively. Discs 166 and 168 differ from discs 118 and 120 of the third embodiment in that they extend completely to the interior surface of shell 102 and define centrally disposed apertures 170 for channeling tobacco smoke to and from the center of disc 160.

Since the contours of surfaces 162 and 164 are essentially identical to surfaces 112 and 114, the coagulatory process takes place in the same manner as earlier described. The flow of smoke across the surfaces, however, differs from the third embodiment as follows. As shown by the arrows in FIG. 11, smoke is channeled through aperture 170 in disc 166 toward the center of anterior surface 162 entering corridors 146 and 147 and moving toward the periphery thereof. Tobacco smoke eventually reaches the outer periphery of surface 162, which is polygonally cut as shown in FIG. 13 to permit the smoke to pass through any of the passageways 172 defined by the overlapping polygonal posterior and anterior surfaces to the posterior surface 164. Smoke then passes through corridors 146 and 147 across the posterior surface 164 toward the center where it is subjected again to the same frequency multiplication and amplitude amplification process, and upon arrival at the center of the posterior surface 164 is channeled through aperture 170 in disc 168 where it is discharged into filter medium 174 such as cotton plug or acetate fiber. In the fourth embodiment, frequency multiplication will take place at the posterior surface 164 as a result of the direction of flow across the surface.

Depending upon the constituents present in the tobacco smoke, which it is desirable to filter, surfaces 112, 114, 162 and 164 can be mathematically dimensioned to achieve selected frequencies or to shift the range of frequencies generated. Generally speaking, the more points of intersection present in the disc, the greater the degree of coagulation and adsorption expected. Moreover, the particular geometry of counterspirally intersecting corridors is not required; other geometries, such as, for example an Archimedes or logarithmic spiral, can also be used. The dimensions of the surfaces shown herein, the number of corridors, valleys and inlet ports are merely exemplary and those of ordinary skill in the art will appreciate that the design may be modified for particular applications.

Reference is now directed to FIGS. 14 through 21. In place of the cigarette mouthpieces 10 and 100, which externally are of uniform diameter, a tapered cigarette mouthpiece 200 is provided having a reduced filter portion 202. The external dimensions of the reduced filter portion 202 are equal to the internal dimensions of the cigarette receiving chamber 204 so that the shells may be stacked in partially telescoping relation. Internally the structure may correspond to any of the embodiments previously described.

Two stacks of tapered mouthpieces 200 are received in a packet or container 206 equal in width to a cigarette pack 208. The packet is fitted with a cap 210 having openings 212 (FIG. 18) in registry with the two stacks of tapered holders 200. At one side the cap 210 is provided with a retainer clip 214 dimensioned to fit within a narrow side of the cigarette pack 208. The cap 210 is also provided with a cover 216 which may be joined thereto by a web hinge 218. In order to secure the cover in place the cover is provided with a fastener pin 220 which may be forced into a perforation 222 (FIG. 18) formed in the cap 210. The filter as contained in the tapered mouthpieces 200 is applied to the cigarette by pressing an end of the cigarette, which may or may not be provided with a conventional filter, axially into the cigarette receiving chamber 204 of the uppermost holder. The dimensions are such that the mouthpiece remains attached to the cigarette.

Although particular embodiments of the invention have been illustrated in the drawings and described herein, it will be understood that the invention is not limited to the embodiments disclosed, but is capable of rearrangement, modification and substitution of parts and elements without departing from the spirit of the invention.

I claim:

1. In a tobacco smoke filter device, the improvement comprising:
   a stimulated coagulation and adsorption filter for removing constituents from tobacco smoke to be positioned in the flow thereof;
   ultrasonic generator means responsive to the flow gradient induced by the smoker for generating an ultrasonic field of sufficiently high frequency to stimulate coagulation and adsorption of constituents in the flow; and
   amplitude multiplier means energized by the flow to increase the vibrational energy to the constituents in the flow sufficiently to promote coagulation and adsorption at the generated frequencies.

2. The filter device of claim 1 further comprising:
   means for concentrating the energy output by the multiplier into a relatively small region of the flow.

3. The filter of claim 1 further comprising:
   a frequency multiplier means acoustically coupled to the generator means for creating a second sonic field having a higher frequency than the first field.

4. The filter of claim 1 wherein the generated frequencies are in the range of 50 kHz to 1 MHz.

5. The filter of claim 1 further comprising:
   a filtering material located downstream of both the generator means and the amplitude multiplier means for retaining the coagulated constituents formed downstream of the disc.

6. In a tobacco smoke filter device, the improvement comprising:
   a stimulated coagulation and adsorption filter for removing constituents from tobacco smoke to be positioned in the flow thereof;
   ultrasonic generator means responsive to the flow gradient induced by the smoker for generating a first sonic field having ultrasonic frequencies to stimulate coagulation and adsorption of constituents in the flow;
   high frequency multiplier means acoustically coupled to the generator means and responsive to frequencies of the generator means, the frequency multiplier means generating a second sonic field whose frequency is greater than the frequency of the first field, and in excess of 50 kHz to promote further coagulation and adsorption of constituents in the flow;
   amplitude multiplier means energized by the flow for increasing the vibrational energy of the constituents in the flow to a level sufficient to stimulate coagulation and adsorption at the frequencies of the first and second fields; and
   means for concentrating the energy output by either one of the multipliers into a relatively small region of the flow.

7. A cigarette mouthpiece for a conventional cigarette to filter constituents from tobacco smoke comprising:
   a tubular structure having filter means and being interiorly dimensioned to receive a conventional cigarette in the distal end thereof;
   a high frequency sonic generating disc means disposed in the structure downstream of the cigarette, the disc means having a contoured surface facing into the flow for creating vortices in the flow at frequencies in excess of about 50 kHz to effect coagulation and adsorption of constituents in the flow;
   a plurality of resonating surface means provided on the disc means, positioned relative to the flow, such that each of the surface means resonates in phase to create a high energy field downstream of the disc means; and
   the surfaces being positioned relative to one another such that substantially all of the energy is concentrated to within a relatively small region in the flow.

8. The filter of claim 7 wherein the resonating surface means are dimensioned to resonate at a selected frequency of the field for coagulating selected constituents in the flow.

9. In a cigarette, a stimulated coagulation and adsorption filter for separating constituents from tobacco smoke adapted to be positioned in the flow thereof, comprising:
   an ultrasonic generating disc means disposed axially of the cigarette downstream of the tobacco, the disc means having a contoured surface facing into the flow for creating vortices in the flow at frequencies greater than about 50 kHz to promote coagulation and adsorption of constituents in the flow;
   a plurality of resonating surface means provided on the disc means, positioned relative to the flow such that each of the surface means resonates in phase to produce a high energy sonic field downstream of the flow, said resonating surface means being oriented relative to one another such that the radiated energy is substantially concentrated into a relatively small area in the flow; and filter means to adsorb said constituents.

10. The cigarette of claim 9 wherein the resonating surface means are dimensioned to resonate at a predetermined optimum frequency for coagulating selected constituents in the flow.

11. In a tobacco smoke filter device, the improvement comprising: a stimulated coagulation and adsorption filter for removing constituents from tobacco smoke and for reducing the formation of noxious gases during combustion, the filter adapted to be positioned in the flow of the tobacco smoke, comprising:

an ultrasonic generating disc means responsive to the flow gradient induced by the smoker, the disc having a centrally defined aperture providing communication between identically contoured anterior and posterior surfaces oriented axially relative to the flow;

first and second nonporous discs positioned upstream and downstream of the anterior and posterior surfaces having slightly less diameter than the generating disc, the first nonporous disc diverting the flow to the periphery of the first disc across the anterior surface to the central aperture;

the second nonporous disc diverting the flow from the central aperture across the posterior surface to the periphery of the second disc;

the anterior and posterior surfaces having means to generate vortices in the flow across each of the surfaces, the constituents in the flow being subjected to increasing frequencies across at least one of the surfaces including frequencies above 50 kHz to cause coagulation and adsorption of constituents in the flow; and the means to generate vortices on the anterior and posterior surfaces also providing surfaces for collision with constituents in the flow, the said means to generate vortices being positioned on each of the anterior and posterior surfaces such that collisions of constituents with said means to generate vortices occur causing constituents in the flow to vibrate in phase with increasing vibrational energy being imparted to the constituents as they cross the anterior and posterior surfaces.

12. The filter of claim 11 wherein the means to generate vortices on the anterior and posterior surface means includes an array of pyramids having curvilinear faces positioned on each of the surfaces such that a network of intersecting corridors are formed between adjacent pyramids;

the network being defined by a set of first corridors defined along the periphery of the disc and extending toward the central aperture, each of the first corridors having identical constant curvature; and a set of second corridors defined at equal intervals along the periphery of the disc and extending toward the central aperture, each of the second corridors having the same constant curvature, the curvature of the second corridors being counter in direction to the curvature of the first corridors.

13. In a tobacco smoke filter device, the improvement comprising: a stimulated coagulation and adsorption filter for removing constituents from tobacco smoke adapted to be positioned in the flow comprising:

an ultrasonic generating disc means responsive to the flow gradient induced by the smoker, the disc having identically contoured anterior and posterior surfaces oriented axially relative to the flow;

first and second nonporous discs having a central aperture defined therein positioned upstream and downstream of the anterior and posterior surfaces and each having a slightly greater diameter than the generating disc, the first nonporous disc diverting the flow of tobacco smoke to the center of the anterior surface across the anterior surface to the periphery of the generating disc;

the second nonporous disc diverting the flow from the periphery of the generating disc across the posterior surface to the central aperture of the second disc;

the anterior and posterior surfaces each having means to generate vortices in the flow across each of the surfaces, the constituents in the flow being subjected to increasing frequencies across at least one of the surfaces, including frequencies above 50 kHz, to cause coagulation and adsorption of constituents in the flow; and the means to generate vortices on the anterior and posterior surfaces also providing surfaces for collision with constituents in the flow, the means to generate vortices being positioned on each of the anterior and posterior surfaces such that collisions of constituents with the means to generate vortices occur causing constituents in the flow to vibrate in phase with increasing vibrational energy as they cross the anterior and posterior surfaces.

14. The filter of claim 13 wherein the means to generate vortices on the anterior and posterior surface means includes an array of pyramids having curvilinear faces positioned on each of the surfaces such that a network of counterspirally intersecting corridors are formed between adjacent pyramids;

the network being defined by a set of first corridors defined at equal intervals along the periphery of the disc and extending toward the central aperture, each of the first corridors having the same constant curvature; and a set of second corridors defined at equal intervals along the periphery of the disc and extending toward the central aperture, each of the second corridors having the same constant curvature, the curvature of the second corridors being counter in direction to the curvature of the first corridors.

* * * * *